(12) United States Patent
Kim et al.

(10) Patent No.: US 10,963,110 B2
(45) Date of Patent: *Mar. 30, 2021

(54) TOUCH SCREEN PANEL AND FABRICATION METHOD THEREOF

(71) Applicant: SAMSUNG DISPLAY CO., LTD., Yongin-si, Gyeonggi-do (KR)

(72) Inventors: Do-Youb Kim, Yongin-si (KR); Won-Kyu Kwak, Yongin-si (KR); Brent Jang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/403,255

(22) Filed: May 3, 2019

(65) Prior Publication Data

US 2019/0258344 A1 Aug. 22, 2019

Related U.S. Application Data

(63) Continuation of application No. 16/011,545, filed on Jun. 18, 2018, now Pat. No. 10,324,578, which is a (Continued)

(30) Foreign Application Priority Data

Aug. 27, 2009 (KR) .................. 10-2009-0079792

(51) Int. Cl.
*G06F 3/044* (2006.01)

(52) U.S. Cl.
CPC .......... *G06F 3/0443* (2019.05); *G06F 3/0446* (2019.05); *G06F 2203/04103* (2013.01);
(Continued)

(58) Field of Classification Search
None
See application file for complete search history.

(56) References Cited

U.S. PATENT DOCUMENTS

| | | |
|---|---|---|
| 5,543,590 A | 8/1996 | Gillespie et al. |
| 5,648,642 A | 7/1997 | Miller et al. |

(Continued)

FOREIGN PATENT DOCUMENTS

| | | |
|---|---|---|
| CN | 101324827 A | 12/2008 |
| JP | 07-146747 | 6/1995 |

(Continued)

OTHER PUBLICATIONS

Chinese Office Action of Chinese Patent Application No. 2010-10189629.7, dated Aug. 2, 2012 claims priority of the corresponding Korean priority application No. 10-2009-0079792, 5 pages.

(Continued)

*Primary Examiner* — Duane N Taylor, Jr.
(74) *Attorney, Agent, or Firm* — Lewis Roca Rothgerber Christie LLP (57) ABSTRACT

A touch screen panel includes first and second sense cells on a same layer and coupling patterns that couple adjacent ones of the first sense cells and adjacent ones of the second sense cells to each other, respectively. The coupling patterns do not cross with each other, thereby improving the ability of the coupling patterns to withstand static electricity. A dummy line formed of a same material as the sense cells may be formed between the first and second sense cells, and the dummy line is electrically coupled to a guard ring located in an area outside of a display area of the touch screen panel, making it possible to overcome the effects of static electricity applied to the front surface of the touch screen panel as well as the side surface thereof.

20 Claims, 5 Drawing Sheets

Related U.S. Application Data continuation of application No. 14/804,235, filed on Jul. 20, 2015, now Pat. No. 10,025,436, which is a continuation of application No. 12/756,103, filed on Apr. 7, 2010, now Pat. No. 9,104,274.

(52) U.S. Cl.
CPC .............. *G06F 2203/04111* (2013.01); *Y10T 29/49105* (2015.01)

(56) References Cited

U.S. PATENT DOCUMENTS

| | | |
|---|---|---|
| 6,188,391 B1 | 2/2001 | Seely et al. |
| 6,587,160 B2 | 7/2003 | Lee et al. |
| 7,190,354 B2 | 3/2007 | Tanaka et al. |
| 8,072,429 B2 | 12/2011 | Grivna |
| 8,134,527 B2 | 3/2012 | Chien et al. |
| 8,188,982 B2 | 5/2012 | You et al. |
| 8,217,902 B2 | 7/2012 | Chang et al. |
| 8,289,296 B2 | 10/2012 | Jeong et al. |
| 8,358,284 B2 | 1/2013 | Jeong et al. |
| 8,493,337 B2 | 7/2013 | Liang et al. |
| 8,605,050 B2 | 12/2013 | Chang et al. |
| 8,610,687 B2 | 12/2013 | Chang et al. |
| 8,610,689 B2 | 12/2013 | Chang et al. |
| 8,624,845 B2 | 1/2014 | Grivna |
| 8,698,768 B2 | 4/2014 | Lee et al. |
| 8,730,191 B2 | 5/2014 | Kim et al. |
| 9,213,376 B2 | 12/2015 | Chang et al. |
| 9,239,654 B2 | 1/2016 | Jang |
| 9,477,351 B2 | 10/2016 | Kim et al. |
| 9,557,780 B2 | 1/2017 | Chang et al. |
| 9,753,576 B2 | 9/2017 | Kim et al. |
| 2007/0240914 A1 | 10/2007 | Lai et al. |
| 2007/0242054 A1 | 10/2007 | Chang et al. |
| 2008/0150906 A1 | 6/2008 | Grivna |
| 2008/0264699 A1 | 10/2008 | Chang et al. |
| 2008/0277259 A1 | 11/2008 | Chang |
| 2008/0309635 A1 | 12/2008 | Matsuo |
| 2009/0085885 A1 | 4/2009 | Wu et al. |
| 2009/0267916 A1 | 10/2009 | Hotelling |
| 2009/0322704 A1 | 12/2009 | Anno |
| 2010/0073310 A1 | 3/2010 | Liang et al. |
| 2010/0110041 A1* | 5/2010 | Jang ................. G06F 3/0412 345/174 |
| 2010/0134436 A1 | 6/2010 | Jeong et al. |
| 2018/0032188 A1 | 2/2018 | Park et al. |

FOREIGN PATENT DOCUMENTS

| | | |
|---|---|---|
| JP | 10-505182 | 5/1998 |
| JP | 2000-149664 A | 5/2000 |
| JP | 3144563 U | 8/2008 |
| JP | 2008-310551 | 12/2008 |
| JP | 5174575 B2 | 4/2013 |
| KR | 1020070102414 A | 10/2007 |
| KR | 100830331 | 5/2008 |
| KR | 1020080096352 A | 10/2008 |
| KR | 1020080110477 A | 12/2008 |
| KR | 10-2010-0061993 | 6/2010 |
| KR | 10-2018-0014393 A | 2/2018 |
| TW | 200915151 A | 4/2009 |
| TW | 200916884 A | 4/2009 |
| TW | M355426 U | 4/2009 |

OTHER PUBLICATIONS

European Office action with Search Report for Patent Application No. 10251229.0, dated Jan. 7, 2014, 7 pages.
JPO Office action dated Mar. 12, 2013, for corresponding Japanese Patent application 2009-270593, (3 pages).
English machine translation of Japanese Utility Publication 3144563, dated Aug. 13, 2008, listed above, (7 pages).
KIPO Office action dated Sep. 27, 2011 issued in the priority application KR 10-2009-0079792, 1 page.
Taiwan Office action dated Oct. 28, 2013, for corresponding Taiwanese Patent application 099115427, (12 pages).
English Abstract of Taiwan Publication 1367437 B, dated Jul. 1, 2012, corresponding to Taiwan Publication 200915151 dated Apr. 1, 2009 listed above.
Taiwan Patent Gazette dated Apr. 1, 2014, for corresponding Taiwanese Patent application 099115427. (2 pages).

\* cited by examiner

TOUCH SCREEN PANEL AND FABRICATION METHOD THEREOF

CROSS-REFERENCE TO RELATED APPLICATIONS

This application is a continuation U.S. patent application Ser. No. 16/011,545, filed Jun. 18, 2018, which is a continuation U.S. patent application Ser. No. 14/804,235, filed Jul. 20, 2015, now U.S. Pat. No. 10,025,436, which is a continuation of U.S. patent application Ser. No. 12/756,103, filed Apr. 7, 2010, now U.S. Pat. No. 9,104,274, which claims priority to and the benefit of Korean Patent Application No. 10-2009-0079792, filed Aug. 27, 2009, the entire content of all of which is incorporated herein by reference.

BACKGROUND

1. Field

An aspect of an embodiment of the present invention relates to a touch screen panel and a fabrication method thereof.

2. Description of Related Art

A touch screen panel is an input device into which a user can input his or her instruction by selecting instruction contents displayed on the screen of an image display device, etc., using a human hand or an object.

To this end, the touch screen panel is provided on the front face of the image display device to convert the contact position directly contacted by the human hand or the object into electrical signals. Therefore, the instruction contents selected on the contact position are accepted as input signals. The touch screen panel may replace a separate input device, such as a keyboard and a mouse, coupled to the image display device.

Types of the above described touch screen panel include a resistive type, a light sensitive type, a capacitive type, etc.

The capacitive type touch screen panel senses the change in capacitance that is formed between a conductive sense pattern and other neighboring sense patterns such as a ground electrode, etc., when it is touched by a human's hand or an object, thereby converting the contact position into electrical signals.

Here, in order to determine the contact position on the contact surface, the sense patterns include first sense patterns (X patterns) coupled in a first direction and second sense patterns (Y patterns) coupled in a second direction.

In the related art, the first and second sense patterns are disposed on different layers, respectively. In other words, for example, the first sense patterns are positioned on the lower layer, and the second sense patterns are positioned on the upper layer, wherein a dielectric layer is interposed therebetween.

However, when the sense patterns are formed on different layers, respectively, the surface resistance of the transparent conductive material (for example, ITO) used as the sense patterns is large so that the width of the coupling part coupling the sense patterns positioned on the same layer is large in order to reduce the surface resistance. In this case, the overlapped area between the coupling parts positioned on the upper and lower layers becomes large so that the parasitic capacitance becomes large, thereby degrading the sensitivity of the sense patterns.

Alternatively, the first and second sense patterns are positioned on the same layer, and they are coupled by forming separate coupling patterns through contact holes formed on the dielectric layer on the upper portion of the first or second sense patterns. Here, the coupling pattern is a metal material having a low resistance value.

For example, as in the related art, the coupling part of the first sense patterns is implemented with the transparent conductive material, and the coupling part of the second sense patterns crossing the coupling part of the first sense patterns is formed in a coupling pattern implemented with low-resistance metal material.

In other words, the first sense patterns are overlapped with the second sense patterns in the area where the coupling pattern is formed, and the width of the coupling pattern is minimized, thereby making it possible to reduce the effects of the parasitic capacitance generated from the overlapped area.

However, in this case, the coupling part coupling the second sense patterns is still formed of transparent conductive material with a high resistance value, the overlapped area between the sensing patterns is reduced, and the coupling pattern is positioned on the upper portion of the dielectric layer, having a disadvantage that it is weak against the static electricity applied from the outside.

SUMMARY

An aspect of an embodiment of the present invention relates to a touch screen panel in which first sense cells and second sense cells formed on a same layer and coupling patterns that couple adjacent ones of the first sense cells and adjacent ones of the second sense cells to each other, respectively, are constituted of a same material as a metal pattern located on a peripheral region of a touch screen panel. The coupling patterns are crossing with each other, thereby improving the ability of the coupling patterns to withstand static electricity, and a fabrication method thereof.

In addition, an aspect of an embodiment of the present invention relates to a touch screen panel in which a dummy line comprising a same material as the sense cells is located between the first and second sense cells on a same layer, and the dummy line is electrically coupled to a guard ring formed in an area outside of the display area of the touch screen panel, making it possible to overcome the effects of static electricity applied to the front surface of the touch screen panel as well as the side surface thereof, and a fabrication method thereof.

Furthermore, an aspect of the present invention relates to a touch screen panel in which when the touch screen panel is formed on an upper substrate constituting a display panel of a flat display panel, it is slantly formed in order to prevent the coupling patterns formed on the touch screen panel from being completely overlapped with the pixels arranged in a stripe shape, making it possible to improve visibility, and a fabrication method thereof.

According to one embodiment of the present invention, a touch screen panel includes: a transparent substrate; a plurality of first coupling patterns on the transparent substrate aligned in a first direction; a plurality of second coupling patterns on the transparent substrate aligned in a second direction and being spaced from the first coupling patterns; a dielectric layer on the first and second coupling patterns and having first and second contact holes respectively corresponding to end portions of the first and second coupling patterns; a plurality of first sense cells arranged in rows extending in the first direction on the dielectric layer; and a plurality of second sense cells arranged in columns extending in the second direction on the dielectric layer. Adjacent ones of the first sense cells are electrically coupled to each other through the first coupling patterns exposed by the first contact holes, and adjacent ones of the second sense cells are electrically coupled to each other through the second coupling patterns exposed by the second contact holes.

The touch screen panel may further include: a plurality of metal patterns on edge portions of a display area on which the first and second sense cells are located on the transparent substrate, the metal patterns electrically coupling the first and second sense cells in column unit or row unit to position detecting lines.

The first and second coupling patterns and the metal patterns may be on a same layer and may be constituted of a metal having a resistance value that is lower than that of a material constituting the first and second sense cells.

The first sense cells and the second sense cells may be alternately arranged and not overlapping with each other.

At least one of the second coupling patterns electrically couples two adjacent ones of the second sense cells to each other. The second coupling patterns may partially overlap with the first sense cells adjacent to the second sense cells coupled by the second coupling patterns. The first and second coupling patterns may be in a rectangular shape.

The first and second sense cells may include a transparent electrode material with a thickness between 100 Å and 300 Å, and the transparent electrode material may be indium tin oxide.

The touch screen panel may further include: a dummy line on the dielectric layer between the first and second sense cells; a guard ring on a peripheral region of a display area on which the first and second sense cells are located, the guard ring being on the transparent substrate and surrounding the display area; and a third contact hole on the dielectric layer corresponding to an end portion of the dummy line, wherein the guard ring and the dummy line are electrically coupled to each other through the third contact hole.

The dummy line may be on a same layer as the first and second sense cells and may include a same transparent conductive material as the first and second sense cells. The dummy line may be formed in a mesh type including intersecting lines coupled to each other and being on an area between the first and second sense cells. The dummy line may include a plurality of end portions extending to an area outside of the display area on which the first and second sense cells are located, and the third contact hole may include a plurality of third contact holes, the plurality of end portions being electrically coupled to the guard ring through the plurality of third contact holes.

The guard ring may be on a same layer as the first and second coupling patterns and may be formed of a same material as the first and second coupling patterns. The transparent substrate may be an upper substrate of a display panel constituting a flat panel display, and the first and second coupling patterns may be slantly formed at an angle.

According to one embodiment of the present invention, there is provided a fabrication method of a touch screen panel. The method includes: forming a plurality of first coupling patterns aligned in a first direction and a plurality of second coupling patterns aligned in a second direction on a transparent substrate, the second coupling patterns being spaced from the first coupling patterns; forming a dielectric layer on the first and second coupling patterns, the dielectric layer having first and second contact holes respectively corresponding to end portions of the first and second coupling patterns; forming first sense cells arranged in rows extending in the first direction on the dielectric layer; and forming second sense cells arranged in columns extending in the second direction on the dielectric layer, wherein adjacent ones of the first sense cells are electrically coupled to each other through the first coupling patterns exposed by the first contact holes, and adjacent ones of the second sense cells are electrically coupled to each other through the second coupling patterns exposed by the second contact holes.

Moreover, the fabrication method of the touch screen panel may further include: forming a dummy line on the dielectric layer between the first and second sense cells; forming a guard ring on a peripheral region of a display area on which the first and second sense cells are located, the guard ring being on the transparent substrate and surrounding the display area; and forming a third contact hole on the dielectric layer corresponding to an end portion of the dummy line, wherein the guard ring and the dummy line are electrically coupled to each other through the third contact hole.

According to one embodiment of the present invention, a touch screen panel includes: a transparent substrate; a plurality of first sense cells on the transparent substrate and being arranged in rows extending in a first direction; a plurality of second sense cells on the transparent substrate and being arranged in columns extending in a second direction; a dielectric layer on the first and second sense cells and having first and second contact holes overlapped with the first and second sense cells, respectively; a plurality of first coupling patterns on the dielectric layer and overlapping the first contact holes and the first sense cells, the first coupling patterns coupling the adjacent first sense cells to each other; and a plurality of second coupling patterns on the dielectric layer and overlapping the second contact holes and the second sense cells, the second coupling patterns coupling the adjacent second sense cells to each other and being spaced from the first coupling patterns.

According to one embodiment of the present invention, there is provided a fabrication method of a touch screen panel. The method includes: forming a plurality of first sense cells arranged in rows extending in a first direction on a transparent substrate; forming a plurality of second sense cells arranged in columns extending in a second direction on the transparent substrate; forming a dielectric layer on the first and second sense cells, the dielectric layer having first and second contact holes overlapped with the first and second sense cells, respectively; forming a plurality of first coupling patterns on the dielectric layer to couple the adjacent first sense cells to each other through the first contact holes, the first coupling patterns being overlapped with the first sense cells and the first contact holes; and forming a plurality of second coupling patterns on the dielectric layer to couple the adjacent second sense cells to each other through the second contact holes, the second coupling patterns being overlapped with the second sense cells and the second contact holes, wherein the second coupling patterns are spaced from the first coupling patterns.

With the embodiments as described above, the coupling patterns that couple adjacent ones of the first sense cells and adjacent ones of the second sense cells, respectively, may be implemented with the metal material having a low resistance value as the metal pattern formed in a peripheral region of the touch screen panel, and the coupling patterns may not be crossing with each other to improve the ability of the coupling patterns to withstand static electricity, making it possible to solve the problem of electrostatic discharge (ESD).

Moreover, the dummy line formed of the same material as the sense cells may be formed on the area between the first and second sense cells, and the dummy line is coupled electrically to the guard ring formed in the outside of the display area of the touch screen panel, making it possible to overcome the effects of static electricity applied to the front surface of the touch screen panel as well as the side surface thereof.

Furthermore, when the touch screen panel is formed on the upper substrate constituting the display panel of the flat display panel, the coupling patterns formed on the touch screen panel may be formed slantly at an angle not to be completely overlapped with the pixels arranged on the display area of the display panel in a stripe shape to reduce or minimize the light emission area of the pixels that is blocked by the coupling patterns, making it possible to improve visibility.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or be indirectly on the another element with one or more intervening elements interposed therebetween. Also, when an element is referred to as being "connected to" or "coupled to" another element, it may be directly connected to the another element or be indirectly connected to the another element with one or more intervening elements interposed therebetween. Hereinafter, like reference numerals refer to like elements.

Hereinafter, exemplary embodiments of the present invention will be described in more detail with reference to the accompanying drawings.

Figure 1A:
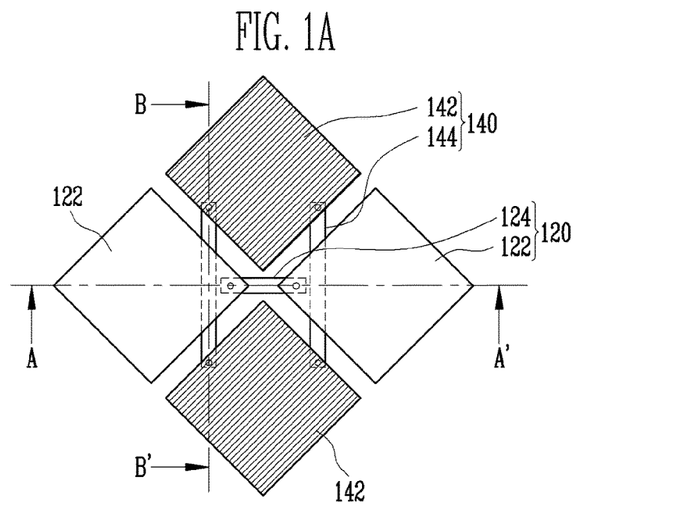
FIG. 1A is a plan view showing the disposition of sense patterns formed on a touch screen panel according a first embodiment of the present invention.
Figure 1B:
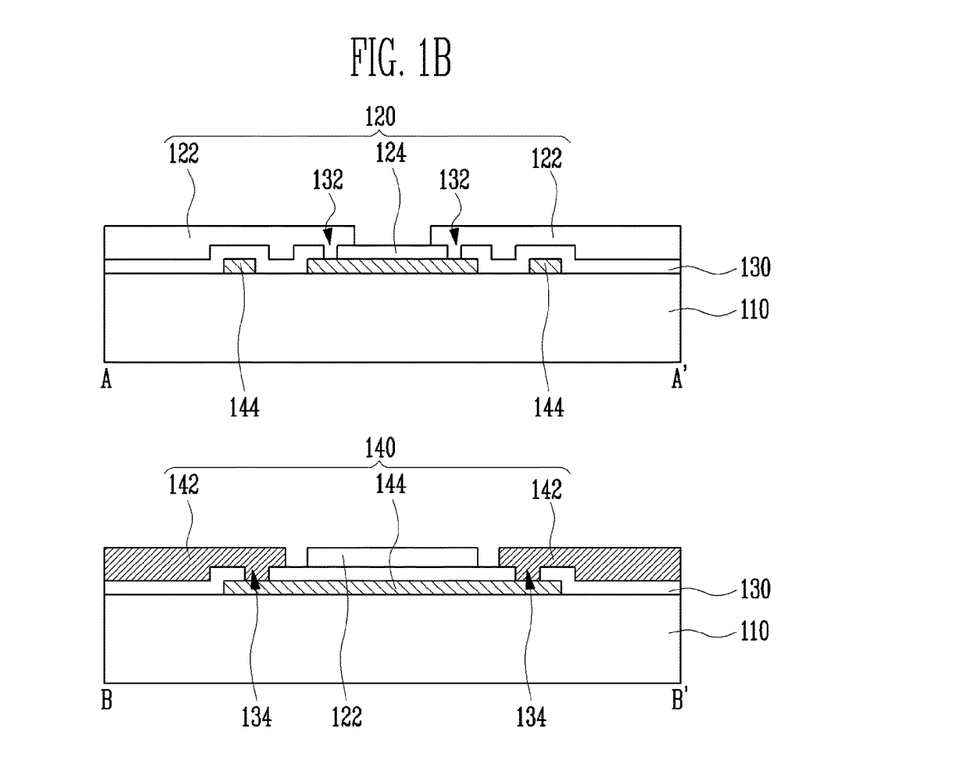
FIG. 1B is a cross-sectional view of portions (A-A' and B-B') of FIG. 1A.

FIG. 1A is a plan view showing sense patterns on a touch screen panel according a first embodiment of the present invention, and FIG. 1B is a cross-sectional view of portions (A-A' and B-B') of FIG. 1A.

Referring to FIGS. 1A and 1B, the sense patterns according to one embodiment of the present invention includes first and second sense patterns 120 and 140 alternately disposed, wherein sense patterns in the same column unit (i.e., having same X coordinate) are coupled to each other, and sense patterns in the same row unit (i.e., having same Y coordinate) are coupled to each other.

In other words, the first sense patterns 120 include first sense cells 122 arranged in rows extending in a first direction (row direction) and a first coupling pattern 124 for coupling adjacent first sense cells 122 to each other in the same row. The second sense patterns 140 include second sense cells 142 arranged in columns extending in a second direction (column direction) and a second coupling pattern 144 for coupling the adjacent second sense cells 142 to each other.

Here, in the above described embodiment, the first sense cells 122 and the second sense cells 142 are formed on the same layer, wherein the first sense cells 122 and the second sense cells 142 may be formed of transparent material in order to implement the operation of the touch screen panel. To this end, the first and second sense cells 122 and 142 are exemplarily formed of transparent conductive material, such as indium-tin-oxide (hereinafter, referred to as "ITO").

Moreover, the respective sense cells arranged in the first direction and the second direction may be electrically coupled to each other so that the first sense cells 122 and the second sense cells 142 function as a sense electrode.

Therefore, the first sense cells 122 are electrically coupled to each other by the first coupling pattern 124, and the second sense cells 142 are electrically coupled to each other by the second coupling pattern 144.

Here, the first sense cells 122 and the second sense cells 142 are formed on the same layer so that the first coupling pattern 124 and the second coupling pattern 144 cannot be formed on the same layer as the first and second sense cells 122 and 142 in order to avoid being electrically shorted.

Therefore, in the first embodiment of the present invention, the first and second coupling patterns 124 and 144 are formed as layers lower than the first and second sense cells 122 and 142.

In other words, referring to FIGS. 1A and 1B, the first and second coupling patterns 124 and 144 are formed on the transparent substrate 110, and the dielectric layer 130 is formed on the transparent substrate 110 including the first and second coupling patterns 124 and 144.

The areas of the dielectric layer 130 corresponding to the ends of the first and second coupling patterns 124 and 144 are opened to form first and second contact holes 132 and 134, respectively, so that the first coupling pattern 124 is electrically coupled to the adjacent first sense cells 122, and the second coupling pattern 144 is electrically coupled to the adjacent second sense cells 142, via the first and second contact holes 132 and 134, respectively.

Furthermore, since the first and second coupling patterns 124 and 144 are formed on the same layer, they are spaced from each other at an interval (e.g., a predetermined interval) in order to avoid being electrically shorted from each other.

In other words, as shown in FIG. 1A, the first coupling pattern 124 electrically couples the adjacent first sense cells 122 to each other arranged in the first direction (row direction), and the second coupling pattern 144, which is spaced from the first coupling pattern 124, electrically couples the adjacent second sense cells 142 to each other arranged in the second direction (column direction).

Although the second coupling pattern 144 is implemented as a pair in coupling the adjacent second sense cells 142 in FIG. 1A, the embodiment is not limited thereto, but the second coupling pattern 144 may be implemented in one.

Moreover, although the first and second coupling patterns 124 and 144 may be formed in a rectangular shape as shown, this is merely one embodiment so that they are not limited to the shape shown in the figures.

In one embodiment of the present invention, the first and second coupling patterns 124 and 144 are formed of low-resistance metal such as the same material as a metal pattern formed on the end of the display area on which the first and second sense cells 122 and 142 are formed to supply signals sensed by the sense cells to a driving circuit.

In this case, since the first and second coupling patterns 124 and 144 are formed on the same layer as the metal pattern through the same process, an additional masking process for forming the first and second coupling patterns is not required, thereby making it possible to reduce the number of processes and the time thereof.

Furthermore, since the coupling patterns 124 and 144 coupling the sense cells to each other are implemented with low-resistance material rather than the transparent conductive material of the sense cells, the charge flow through the coupling patterns of the sense cells can be improved, making it possible to improve sensitivity of the sense cells.

In addition, the ability of the coupling patterns to withstand static electricity is improved by positioning the respective coupling patterns not to cross each other, making it possible to solve the problem of electrostatic discharge (ESD). Further, as shown in FIG. 1A, the second coupling patterns 144 overlap with the first sense cells 122 adjacent to the second sense cells 142 coupled to each other by the second coupling patterns 144, making it possible to prevent the charges passing through the second coupling patterns 144 from being concentrated in a narrow space.

Figure 2A:
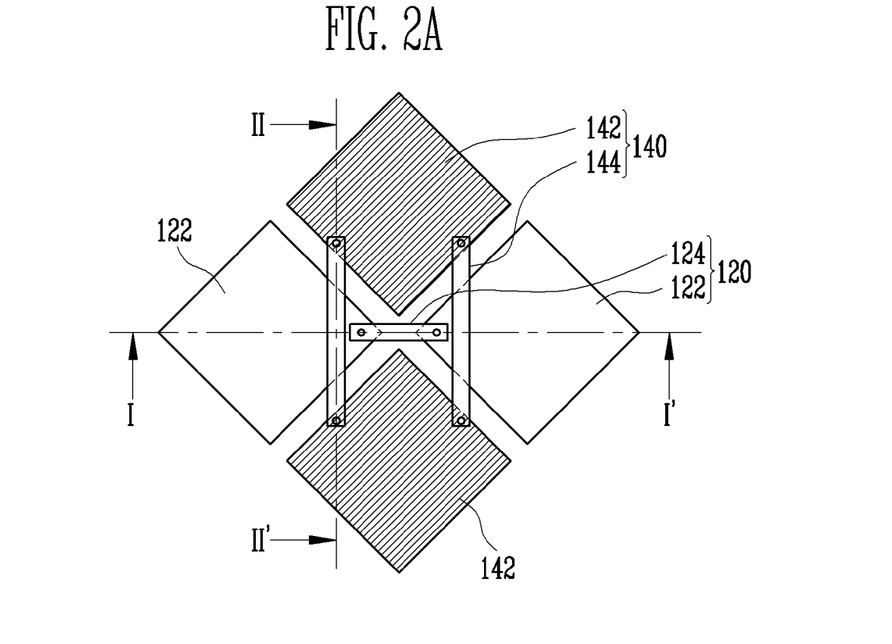
FIG. 2A is a plan view showing the disposition of sense patterns formed on a touch screen panel according a second embodiment of the present invention.
Figure 2B:
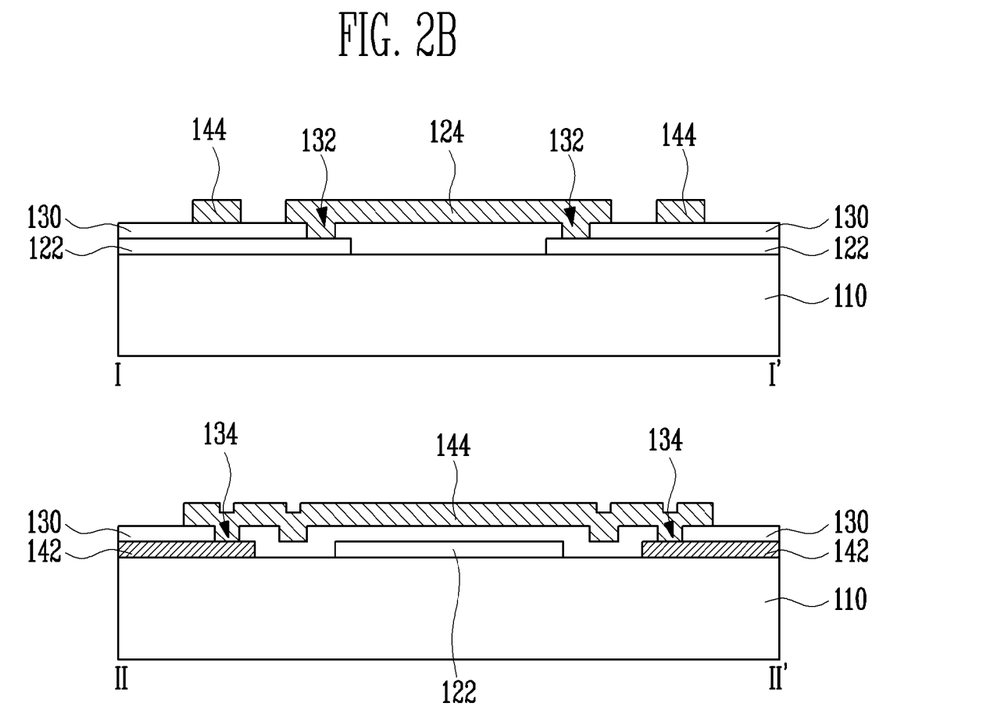
FIG. 2B is a cross-sectional view of portions (I-I' and II-II') of FIG. 2A.

FIG. 2A is a plan view showing the disposition of sense patterns formed on a touch screen panel according a second embodiment of the present invention, and FIG. 2B is a cross-sectional view of portions (I-I' and II-II') of FIG. 2A.

In the first embodiment of the present invention as explained through FIG. 1, the first and second coupling patterns 124 and 144 are formed on layers below the first and second sense cells 122 and 142 by way of example, but the present invention is not limited thereto.

In other words, as shown in FIGS. 2A and 2B, the first and second coupling patterns 124 and 144 may be formed on layers above the first and second sense cells 122 and 142, and in this case, the sense cells 122 and 142 are first formed on a transparent substrate 110, then a dielectric layer 130 in which first and second contact holes 132 and 134 are formed is formed thereon, and the first and second coupling patterns 124 and 144 are formed on the areas on the dielectric layer 130 including the first and second contact holes 132 and 134.

In the second embodiment of the present invention, the first sense cells 122 arranged in rows extending in a first direction (row direction) and the second sense cells 142 arranged in columns extending in a second direction (column direction) are formed on the transparent substrate 110, and the dielectric layer 130 is formed on the first and second sense cells 122 and 142.

However, on the dielectric layer, as shown, the respective first and second contact holes 132 and 134 are formed on a portion of the overlapped area with the respective first and second sense cells 122 and 142.

In addition, in order to electrically couple the first sense cells 122 to each other, the first coupling pattern 124 is formed on the dielectric layer 130 in the area including the first contact holes 132 positioned on the overlapped area with the first sense cells 122. In order to electrically couple the adjacent second sense cells 142 to each other, the second coupling pattern 144 is formed on the dielectric layer 130 in the area including the second contact holes 134 positioned on the overlapped area with the second sense cells 142.

Here, as shown in FIG. 2A, the second coupling pattern 144 is spaced at an interval (e.g., a predetermined interval) from the first coupling pattern 124 in order to avoid short circuit between the coupling patterns.

However, in this case, only the order of the respective layers is changed but the detailed constitution and effects thereof are the same as the aforementioned embodiment so that the detailed description thereof will be omitted.

Figure 3:
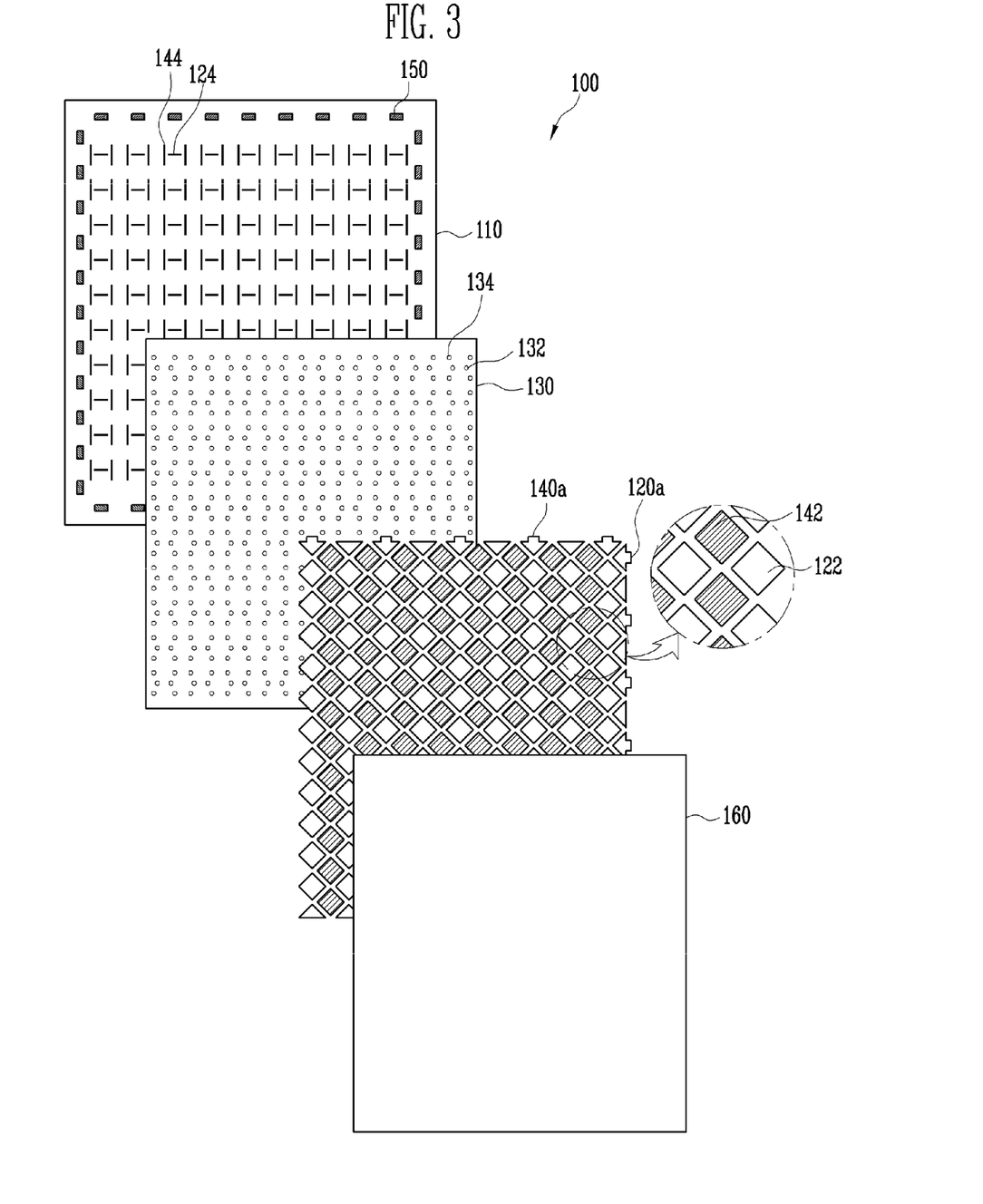
FIG. 3 is an exploded plan view of the touch screen panel of FIG. 1 according to the first embodiment of the present invention.

FIG. 3 is an exploded plan view of the touch screen panel of FIG. 1 according to the first embodiment of the present invention.

Referring to FIG. 3, the touch screen panel 100 according to the embodiment of the present invention includes: a transparent substrate 110; a plurality of first coupling patterns 124 arranged on the transparent substrate 110 in a first direction; a plurality of second coupling patterns 144 arranged on the transparent substrate 110 in a second direction and spaced from the first coupling patterns 124 at an interval (e.g., a predetermined interval); a dielectric layer 130 formed on the first and second coupling patterns 124 and 144 and formed with first and second contact holes 132 and 134 on the areas respectively corresponding to the ends of the first and second coupling patterns 124 and 144; and first and second sense cells 122 and 142 formed on the dielectric layer 130.

Here, the first sense cells 122 are formed on the area including the pair of adjacent first contact holes 132 and are electrically coupled to the first coupling patterns 124 that are exposed through the first contact holes 132, and the first sense cells 122 and the first coupling pattern 124 coupling the first sense cells 122 constitute a first sense pattern 120.

In a similar manner, the second sense cells 142 are formed on the area including the pair of adjacent second contact holes 134 to be electrically coupled to the second coupling patterns 144 that are exposed through the second contact holes 134, and the second sense cells 142 and the second coupling pattern 144 coupling the second sense cells 142 constitute a second sense pattern 140.

Furthermore, a plurality of metal patterns 150 arranged on the edges of the display area on which the first and second sense patterns 120 and 140 are formed to electrically couple the sense patterns column-by-column or row-by-row to position detecting lines.

In other words, the metal patterns 150 are disposed on the edge area of the area on which the first and second sense patterns 120 and 140 are formed, for example, on the area corresponding to the pads 120*a* and 140*a* of the first and second sense patterns 120 and 140.

The metal patterns 150 electrically couple the sense patterns 120 and 140 in column unit or row unit to the position detecting lines, respectively, to allow contact position detecting signals to be supplied to a driving circuit, etc.

The plurality of metal patterns 150 are exemplarily formed through the same process as the first and second coupling patterns 124 and 144, and thus, the metal patterns 150 are formed on the transparent substrate 110 and are implemented with low-resistance metal.

The first sense cells 122 are formed to be coupled onto one surface of the dielectric layer according to the first direction. For example, the first sense cells 122 may be formed with regular patterns such as a diamond pattern and are close to each other on the upper surface of the dielectric layer 130.

Here, the shape of the first sense cells 122 is not limited to the diamond pattern but may be implemented in various suitable patterns in which the first sense cells 122 can be close to each other.

The first sense patterns 120 have pads 120a so that they can be electrically coupled to the metal patterns 150 row-by-row. The pads 120a of the first sense patterns 120 may be provided row-by-row alternately on the right and left sides or on both the right and left sides.

Moreover, the second sense cells 142 are disposed alternately with the first sense cells 122 not to be overlapped with the first sense cells 122, while being formed on the dielectric layer 130 on which the first sense cells 122 are formed according to the second direction.

The second sense cells 142 may be formed to be close to each other in a diamond pattern, in the same manner as the first sense cells 122.

The second sense patterns 140 have pads 140a so that they can be electrically coupled to the metal patterns 150 in column-by-column. The pads 140a of the second sense patterns 140 may be provided column-by-column alternately on the upper and lower sides or on both the upper and lower sides.

Here, the first sense cells 122 are not formed on the area overlapped with the second sense cells 142. In other words, the first sense cells 122 and the second sense cells 142 are alternately disposed to be crossed to each other.

However, when the first and second sense cells 122 and 142 are formed on the dielectric layer 130, they are formed on the area including first and second contact holes 132 and 134 provided in the dielectric layer 130, respectively. The first and second sense cells 122 and 142 are electrically coupled to the first and second coupling patterns 124 and 144 exposed through the first and second contact holes 132 and 134, respectively.

In one embodiment of the present invention, the first and second coupling patterns 122 and 144 are formed on the bottom layer of the touch screen panel 100 and are arranged not to be crossed to each other, making it possible to improve the ability of the touch screen panel to withstand static electricity and to secure contact stability with the dielectric layer 130.

Moreover, in one embodiment of the present invention, the transparent substrate 110 may be implemented as the upper substrate of a display panel constituting the flat panel display so that the first and second sense cells 122 and 142 and the dielectric layer 130 are formed of transparent material so that the light emitted from the display panel disposed below the touch screen panel 100 can transmit through the touch screen panel 100.

In other words, the first and second sense cells 122 and 142 are formed of transparent electrode material such as indium tin oxide (hereinafter, referred to as "ITO"), and the dielectric layer 130 is formed of transparent dielectric material.

The thickness of the first and second sense patterns 120 and 140 and the dielectric layer 130 may be set in the range such that the touch screen panel 100 (in particular, the first and second sense cells 122 and 142) has a relatively low surface resistance, while securing the transmittance that the light from the display panel is transmitted. In other words, the thickness of the first and second sense patterns 120 and 140 and the dielectric layer 130 may be set to be optimized in consideration of the transmittance and the surface resistance.

For example, the first and second sense cells 122 and 142 may be formed as an "ITO" pattern having a thickness of 100 to 300 Å, respectively, and the dielectric layer 130 may be formed of transparent dielectric material having a thickness of 400 to 1000 Å (e.g., thickness of 400 to 700 Å) where light refractive index of 1.6 to 1.9 is secured. However, this is merely one embodiment and the present invention is not limited thereto. The thickness of the first and second sense patterns 120 and 140 and the dielectric layer 130 may, of course, be changed in consideration of the transmittance and/or the surface resistance, etc.

In addition, a protecting layer 160 may be formed on the first and second sense cells 122 and 124 to cover them. For example, the protecting layer 160 may be formed of transparent dielectric material having a thickness of 400 to 1000 Å on the first and second sense cells 122 and 142. However, the protecting layer 160 may also be omitted according to a product design.

The second embodiment shown in FIG. 2 has the same constitution as that of the first embodiment, excepting that the first and second coupling patterns 124 and 144 are formed on layers above the first and second sense cells 122 and 142, so that the exploded plan view of the second embodiment and the detailed description thereof will be omitted.

Figure 4:
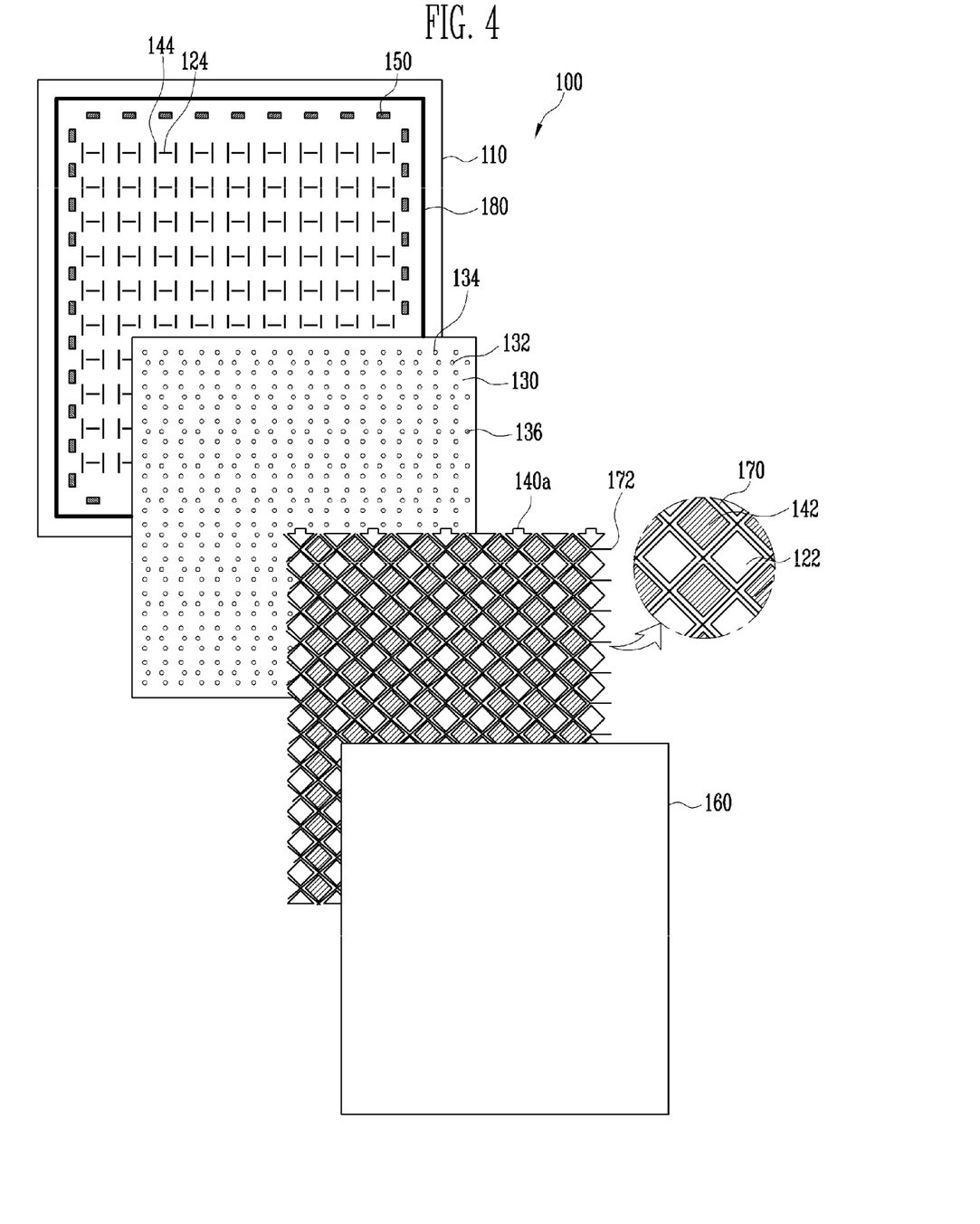
FIG. 4 is an exploded plan view of a touch screen panel according to a third embodiment of the present invention.

FIG. 4 is an exploded plan view of a touch screen panel according to a third embodiment of the present invention.

Compared with the aforementioned first and second embodiments, the third embodiment of the present invention is different therefrom in that a dummy line 170 formed of the same material as the sense cells is formed on the area between the first and second sense cells 122 and 124, and the dummy line 170 is electrically coupled to a guard ring 180 formed at the outside of the display area of the touch screen panel. Therefore, the same reference numerals in the drawings will be used for the same constituents as the first and second embodiments, and the detailed description thereof will be omitted.

However, for the convenience of explanation, in the third embodiment, the first and second coupling patterns 124 and 144 are formed on layers below the first and second sense cells 122 and 142 by way of example, but the embodiment of the present invention is not limited thereto. In other words, the first and second coupling patterns 124 and 144 may be formed on layers above the first and second sense cells 122 and 142.

Referring to FIG. 4, the touch screen panel 100 according to the third embodiment of the present invention includes: a transparent substrate 110; a plurality of first coupling patterns 124 arranged on the transparent substrate 110 in a first direction; a plurality of second coupling patterns 144 arranged on the transparent substrate 110 in a second direction, being spaced from the first coupling pattern 124 at an interval (e.g., a predetermined interval); a dielectric layer 130 formed on the first and second coupling patterns 124 and 144 and formed with first and second contact holes 132 and 134 on the areas respectively corresponding to the ends of the first and second coupling patterns 124 and 144; first and second sense cells 122 and 142 formed on the dielectric layer 130; a dummy line 170 formed on the area between the first and second sense cells 122 and 142, of the area on the dielectric layer 130; a guard ring 180 formed around the periphery of a display area on which the first and second sense cells 122 and 142 are formed, of the area on the transparent substrate 110, in a shape to surround the display area; and a third contact hole 136 formed on the dielectric layer corresponding to the area corresponding to the end of the dummy line 170, wherein the guard ring 180 is electrically coupled to the dummy line 170 through the third contact hole 136.

Here, the dummy line 170, which is formed on the area between the first and second sense cells 122 and 142, is formed on the same layer as the first and second sense cells through the same process and is implemented with the same transparent conductive material (for example, ITO) as the sense cells.

For example, as shown, the dummy line 170 is formed in a mesh type, which includes intersecting lines coupled to each other, on the area between the first and second sense cells 122 and 142. The plurality of ends of the dummy line 170 extend to the outside of the display area on which the sense cells are formed and are electrically coupled to the guard ring 180 through the third contact holes 136 of the dielectric layer 130.

In other words, since the first sense cells 122 and the second sense cells 142 are disposed to be crossed to each other, there is a space therebetween so that the dummy line 170 is formed in the gap between the first and second sense cells 122 and 142.

Moreover, as shown, the guard ring 180 is formed on the same layer as the first and second coupling patterns 124 and 144 through the same process and, thus, is implemented with the same low-resistance metal as the coupling patterns. The guard ring 180 is provided to protect the panel from the static electricity applied from the lateral side of the touch screen panel when ground voltage is applied on the guard ring 180.

Through the constitution as described above, with the guard ring 180, the panel may be protected from the static electricity applied from the lateral side of the touch screen panel as well as the electrostatic discharge (ESD) caused by the static electricity applied to the front surface of the panel, which is the display area of the panel, when the ground voltage is applied to the dummy line 170 that is electrically coupled to the guard ring 180.

Moreover, as described above, the first sense cells 122 are formed on the area including the pair of adjacent first contact holes 132 to be electrically coupled to the first coupling patterns 124 that are exposed through the first contact holes 132. The first sense cells 122 and the first coupling pattern 124 coupling the first sense cells 122 to each other constitute a first sense pattern 120.

In a similar manner, the second sense cells 142 are formed on the area including the pair of adjacent second contact holes 134 to be electrically coupled to the second coupling patterns 144 that are exposed through the second contact holes 134. The second sense cells 142 and the second coupling pattern 144 coupling the second sense cells 142 constitute a second sense pattern 140.

Furthermore, a plurality of metal patterns 150 arranged on the edges of the display area on which the first and second sense patterns 120 and 140 are formed to electrically couple the sense patterns in column-by-column or row-by-row to position detecting lines.

In other words, the metal patterns 150 are disposed on the edge of the area on which the first and second sense patterns 120 and 140 are formed, for example, on the area corresponding to the pads 120a and 140a of the first and second sense patterns 120 and 140.

The metal patterns 150 electrically couples the sense patterns 120 and 140 in column unit or row unit to the position detecting lines, respectively, to allow contact position detecting signals to be supplied to a driving circuit, etc.

The plurality of metal patterns 150 are exemplarily formed through the same process as the first and second coupling patterns 124 and 144, and thus, the metal patterns 150 are formed on the transparent substrate 110 and are implemented with low-resistance metal.

Figure 5A:
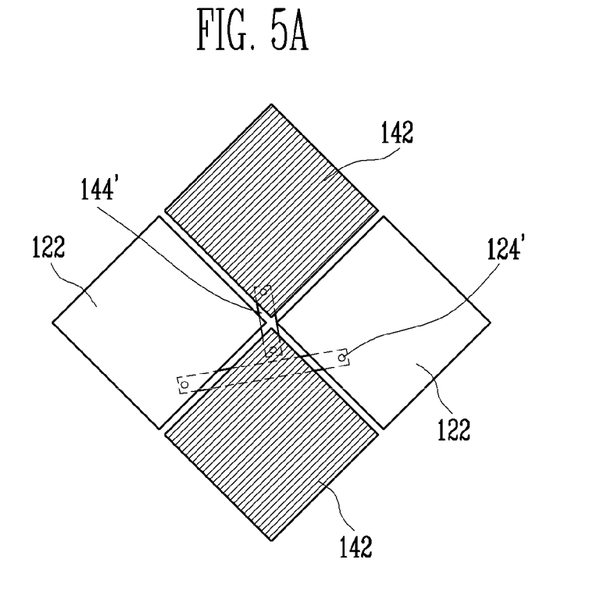
FIGS. 5A and 5B are plan views showing the disposition of sense patterns formed on a touch screen panel according a fourth embodiment of the present invention.
Figure 5B:
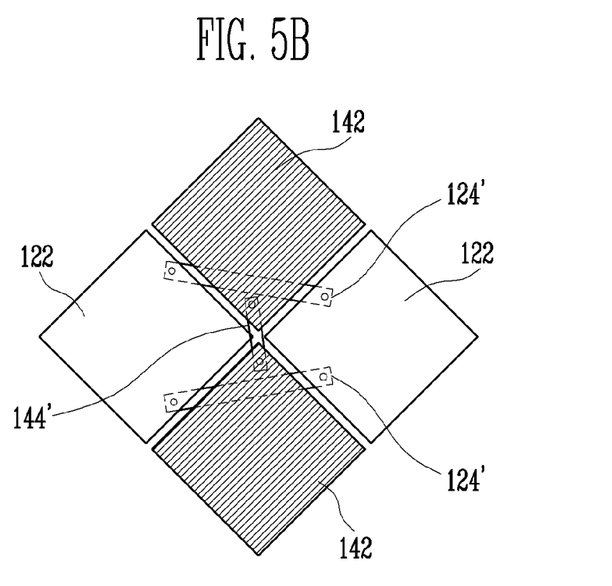

FIGS. 5A and 5B are plan views showing the disposition of sense patterns formed on a touch screen panel according a fourth embodiment of the present invention.

However, compared with the aforementioned first embodiment and the second embodiment, the fourth embodiment of the present invention is different therefrom in that when forming the touch screen panel on an upper substrate constituting the display panel of a flat panel display, first and second coupling patterns formed on the touch screen panel are slantly formed at an angle (e.g., a predetermined angle) not to be completely overlapped with pixels arranged in a stripe shape on the display area of the display panel. Therefore, the same reference numerals in the drawings will be used for the same constituents as the first and second embodiments, and the detailed description thereof will be omitted.

However, for the convenience of explanation, in the fourth embodiment, the first and second coupling patterns 124 and 144 are formed on layers below the first and second sense cells 122 and 142 by way of example, but the present invention is not limited thereto. In other words, the first and second coupling patterns 124 and 144 may be formed on layers above the first and second sense cells 122 and 142.

As aforementioned, the transparent substrate 110 of the touch screen panel according to one embodiment of the present invention may be implemented as the upper substrate of the display panel constituting the flat panel display.

Referring to FIGS. 5A and 5B, in the fourth embodiment of the present invention, first sense patterns 120 include first sense cells 122 arranged in rows extending in a first direction (row direction) and a first coupling pattern 124' coupling the adjacent first sense cells 122 to each other, and second sense patterns 140 includes second sense cells 142 arranged in columns extending in a second direction (column direction) and a second coupling pattern 144' coupling the adjacent second sense cells 142 to each other, wherein the first and second coupling patterns 124' and 144' are not horizontally or vertically formed but are formed slantly at an angle (e.g., a predetermined angle).

Here, the first coupling pattern 124' or the second coupling pattern 144' may be implemented as at least one coupling pattern, and FIG. 5B shows an embodiment where the first coupling pattern 124' is implemented as a pair of coupling patterns.

The first and second coupling patterns 124' and 144' formed on the touch screen panel are not completely overlapped with the pixels arranged in a stripe shape on the display area of the display panel, when the touch screen panel is formed on the upper substrate constituting the display panel of the flat panel display.

In other words, when the first and second coupling patterns are horizontally or vertically arranged as shown in FIGS. 1 and 2, they may be completely overlapped with the pixels arranged in a stripe shape on the display area of the display panel.

Here, the coupling patterns implemented with metal material are colored, thereby blocking the image emitted from the display panel. Therefore, if some coupling patterns are completely overlapped with the pixels formed on the area corresponding thereto as the coupling patterns are arranged in the same direction or in the vertical direction to the pixels, a problem arises that the light emitted from the overlapped pixels is blocked by the coupling patterns to be shown as dark spots.

In the embodiment of the present invention shown in FIGS. 5A and 5B, the first and second coupling patterns are slantly disposed to reduce or minimize the overlapping area between first and second coupling patterns and the pixels formed on the area corresponding to the coupling patterns. Therefore, the dark spots can be reduced.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
a substrate;
a first connection pattern on the substrate;
a second connection pattern on the substrate;
a third connection pattern on the substrate;
a dielectric layer covering the first connection pattern and the second connection pattern on the substrate, the dielectric layer comprising contact holes corresponding to end portions of the first connection pattern and the second connection pattern;
a first sensing cell on the dielectric layer;
a second sensing cell on the dielectric layer;
a third sensing cell on the dielectric layer;
a fourth sensing cell on the dielectric layer; and
a dummy pattern on the dielectric layer,
wherein the first sensing cell and the second sensing cell are arranged in a first direction,
wherein the third sensing cell and the fourth sensing cell are arranged in a second direction,
wherein the first sensing cell is electrically connected to the second sensing cell by the first connection pattern and the second connection pattern at which the first connection pattern and the second connection pattern are exposed by the contact holes,
wherein the third sensing cell is electrically connected to the fourth sensing cell by the third connection pattern,
wherein a portion of the first connection pattern is inclined with respect to the first or second direction,
wherein a portion of the second connection pattern is inclined with respect to the first or second direction, and
wherein the dummy pattern is on a same layer as the first sensing cell, the second sensing cell, the third sensing cell, and the fourth sensing cell.

2. The touch screen panel as claimed in claim 1, wherein a ground voltage is applied to the dummy pattern.

3. The touch screen panel as claimed in claim 1, further comprising a plurality of metal patterns on the substrate,
wherein the metal patterns are electrically coupled to at least one of the first sensing cell, the second sensing cell, the third sensing cell, and the fourth sensing cell,
wherein the metal patterns are in a peripheral region of a display area of the substrate, and
wherein the first connection pattern, the second connection pattern, and the metal patterns are formed in a same layer.

4. The touch screen panel as claimed in claim 3, further comprising a guard ring on a same layer as the first connection pattern and the metal patterns, the guard ring being in a peripheral region.

5. The touch screen panel as claimed in claim 4, wherein a ground voltage is applied to the guard ring.

6. A touch screen panel comprising:
a substrate;
a plurality of metal patterns on the substrate;
a plurality of first connection patterns on the substrate;
a dielectric layer covering the first connection patterns and the substrate, the dielectric layer comprising contact holes corresponding to end portions of the first connection patterns;
a plurality of first sensing cells arranged in a first direction on the dielectric layer, the first sensing cells being arranged in a display area of the substrate;
a plurality of second sensing cells arranged in a second direction on the dielectric layer, the second sensing cells being arranged in the display area of the substrate; and
a dummy pattern on the substrate,
wherein adjacent ones of the first sensing cells are electrically coupled to each other along the first direction by the first connection patterns at which the first connection patterns are exposed by the contact holes,
wherein at least two of the first connection patterns electrically couple two adjacent ones of the first sensing cells to each other,
wherein the end portions of the first connection patterns are inclined at an oblique angle with respect to the first direction, and
wherein the dummy pattern is on a same layer as the first sensing cells and the second sensing cells.

7. The touch screen panel as claimed in claim 6, further comprising a plurality of metal patterns on the substrate,
wherein the metal patterns are electrically coupled to at least one of the first sensing cells and at least one of the second sensing cells,
wherein the metal patterns are in a peripheral region of the display area of the substrate, and
wherein the first connection patterns and the metal patterns are formed in a same layer.

8. The touch screen panel as claimed in claim 6, wherein a ground voltage is applied to the dummy pattern.

9. The touch screen panel as claimed in claim 6, further comprising a guard ring on a same layer as the first connection patterns and the metal patterns, the guard ring being in a peripheral region.

10. The touch screen panel as claimed in claim 9, wherein a ground voltage is applied to the guard ring.

11. A touch screen panel comprising:
a substrate;
a first connection pattern on the substrate;
a second connection pattern on the substrate;
a third connection pattern on the substrate;
a dielectric layer covering the first connection pattern and the second connection pattern on the substrate, the dielectric layer comprising contact holes corresponding to end portions of the first connection pattern and the second connection pattern;
a first sensing cell on the dielectric layer;
a second sensing cell on the dielectric layer;
a third sensing cell on the dielectric layer;
a fourth sensing cell on the dielectric layer; and
a dummy pattern on the dielectric layer, wherein the first sensing cell and the second sensing cell are arranged in a first direction, wherein the third sensing cell and the fourth sensing cell are arranged in a second direction, wherein the first sensing cell is electrically connected to the second sensing cell by the first connection pattern and the second connection pattern at where the first connection pattern and the second connection pattern are exposed by the contact holes, wherein the third sensing cell is electrically connected to the fourth sensing cell by the third connection pattern, and wherein the dummy pattern is on a same layer as the first sensing cell, the second sensing cell, the third sensing cell, and the fourth sensing cell.

12. The touch screen panel as claimed in claim 11, wherein a ground voltage is applied to the dummy pattern.

13. The touch screen panel as claimed in claim 11, further comprising a plurality of metal patterns on the substrate, wherein the metal patterns are electrically coupled to at least one of the first sensing cell, the second sensing cell, the third sensing cell, and the fourth sensing cell, wherein the metal patterns are in a peripheral region of a display area of the substrate, and wherein the first connection pattern, the second connection pattern, and the metal patterns are formed in a same layer.

14. The touch screen panel as claimed in claim 13, further comprising a guard line on a same layer as the first connection pattern and the metal patterns, the guard line being in a peripheral region.

15. The touch screen panel as claimed in claim 14, wherein a ground voltage is applied to the guard line.

16. A touch screen panel comprising:
a substrate;
a plurality of metal patterns on the substrate;
a plurality of first connection patterns on the substrate;
a dielectric layer covering the first connection patterns and the substrate, the dielectric layer comprising contact holes corresponding to end portions of the first connection patterns;
a plurality of first sensing cells arranged in a first direction on the dielectric layer, the first sensing cells being arranged in a display area of the substrate;
a plurality of second sensing cells arranged in a second direction on the dielectric layer, the second sensing cells being arranged in the display area of the substrate; and
a dummy pattern on the substrate, wherein adjacent ones of the first sensing cells are electrically coupled to each other along the first direction by the first connection patterns at where the first connection patterns are exposed by the contact holes, wherein at least two of the first connection patterns electrically couple two adjacent ones of the first sensing cells to each other, and wherein the dummy pattern is on a same layer as the first sensing cells and the second sensing cells.

17. The touch screen panel as claimed in claim 16, further comprising a plurality of metal patterns on the substrate, wherein the metal patterns are electrically coupled to at least one of the first sensing cells and at least one of the second sensing cells, wherein the metal patterns are in a peripheral region of the display area of the substrate, and wherein the first connection patterns and the metal patterns are formed in a same layer.

18. The touch screen panel as claimed in claim 16, wherein a ground voltage is applied to the dummy pattern.

19. The touch screen panel as claimed in claim 16, further comprising a guard line on a same layer as the first connection patterns and the metal patterns, the guard line being in a peripheral region.

20. The touch screen panel as claimed in claim 19, wherein a ground voltage is applied to the guard line.

* * * * *